United States Patent [19]

Impink, Jr. et al.

[11] Patent Number: 5,024,801
[45] Date of Patent: Jun. 18, 1991

[54] REACTOR CORE MODEL UPDATE SYSTEM

[75] Inventors: Albert J. Impink, Jr., Murrysville; Louis R. Grobmyer, North Huntingdon; Robert E. Sariscak, Monroeville; Toshio Morita, Wilkinsburg, all of Pa.; John L. Duryea, Bay City, Tex.

[73] Assignee: Westinghouse Electric Corp., Pittsburgh, Pa.

[21] Appl. No.: 345,872

[22] Filed: May 1, 1989

[51] Int. Cl.$^5$ ............................................. G21C 7/36
[52] U.S. Cl. .................................. 376/217; 376/216; 376/218; 364/492
[58] Field of Search ............... 376/216, 215, 219, 217, 376/218; 364/140, 148, 550, 492

[56] References Cited

U.S. PATENT DOCUMENTS

| | | | |
|---|---|---|---|
| 4,637,910 | 1/1987 | Impink, Jr. ........................ | 376/216 |
| 4,642,213 | 2/1987 | Impink, Jr. . | |
| 4,711,753 | 12/1987 | Impink, Jr. et al. ................ | 376/216 |
| 4,774,050 | 9/1988 | Impink, Jr. ........................ | 376/245 |
| 4,803,039 | 2/1989 | Impink ............................... | 376/216 |
| 4,839,134 | 6/1989 | Impink ............................... | 376/216 |
| 4,927,594 | 5/1990 | Heibel ............................... | 376/258 |

Primary Examiner—Donald P. Walsh
Attorney, Agent, or Firm—Z. L. Dermer

[57] ABSTRACT

The present invention is a system that updates a pressurized water reactor core model, or data file describing the core, periodically using measured values determinable from core instrumentation. The system starts with a calibrated model calibrated from a flux map and a boron concentration measurement both determined monthly. Reactor system measurements are performed and the model is updated from the measurements using a standard depletion calculation. Some of the measured values are also used to determine measured actual values of axial offset and pinch. Standard neutronics equations are used to calculate analytical values of axial offset and pinch from the model, and the measured and calculated values are compared. If a deviation beyond a certain magnitude is detected, buckling coefficients in the model are adjusted to compensate for model drift. The updated model is stored and a time-out period is entered until it is time for another drift compensation cycle to start. The adjustment overcompensates the coefficients until the difference between the measured values and calculated values is slightly less in magnitude than the deviation but of an opposite sign. The adjusted and updated model can be used for accurate initial values of a core predictor or for display to the operator.

7 Claims, 3 Drawing Sheets

REACTOR CORE MODEL UPDATE SYSTEM

CROSS REFERENCES TO RELATED APPLICATIONS

This application is related to U.S. Pat. Nos. 4,774,050; 4,642,213 and 4,711,753 incorporated by reference herein.

BACKGROUND OF THE INVENTION

1. Field of the Invention

The present invention is a system for automatically and periodically updating and adjusting an on-line pressurized water reactor core analytical model, which consists of a data file of parameters that describe the reactor core, to insure that at all times the model (data file) closely matches the then current characteristics of the modeled and monitored core, so that real-time and anticipating graphics displays representative of the operating characteristics of the actual core can be generated for a plant operator's use and an attached core parameter predictor can be reliably initialized by a user at any time, even through only minimal core monitoring and analytical capabilities are available.

2. Description of the Related Art

An analytical core model has, in the context of the present invention, three essential components. The first of these is the broad collection of facts that encompasses the physical description of the core and the nuclear cross section data sets that describe the relative rates at which various nuclear reactions will occur in the core. The second of these several components is the current set of spatial distributions of time varying concentrations of certain transient nuclear isotopes that significantly affect local neutron balances throughout the core. Typical isotopes of concern are xenon-135 and samarium-149 precursors, iodine-135 and promethium-149, and, on a longer time scale, long term burn-up. The last essential component of the model is that small set of coefficients that, coupled with certain algorithms embedded in neutronics calculation sequences, allows complex nuclear phenomenom that are known to be operative in the reactor core to be replicated with a sufficient degree of accuracy by very simple approximation.

The concept of updating the analytical core model relates to the tracking in time of the changes that occur in the local concentrations of the several nuclides that are of primary consideration in satisfying the second component of the analytical core model. The concept of adjusting the analytical core model relates to modifying one or more of the co-efficients that make up the third component of the analytical core model, so that the simple approximations used to replicate the affects of complex nuclear processes in the core provide the best available replication. With respect to the above components, two distinct problems pose themselves.

The first problem relates to obtaining, on-line, sufficient information regarding the current distribution of nuclear power, iodine-135 and xenon-135 to be able to supply the reactor operator with reliable, concise indicators both of actual current core conditions and of trends in current core conditions, so that the operator can effectively and efficiently exercise control functions using xenon distribution displays as described in U.S. Pat. No. 4,642,213. In this context, the reactor operator can well include dedicated automatic control systems that carry out nominally human control functions. Various known approaches to successfully solving this problem include the use of the responses of many strings of fixed incore detectors to synthesize full three dimensional core power distributions from which the needed indicators are readily extracted, the use of on-line three dimensional analytical core models, augmented by a modest number of plant instrumentation signals, again to generate a comparably useable three dimensional core power distribution, and the use only of the signals from conventional plant instrumentation, filtered through empirically derived correlations, to produce detailed one dimensional core average axial power distributions and the needed derivative indicators such as is described in the U.S. Pat. No. 4,774,050. The use of many strings of fixed incore detectors necessarily commits the plant owner to relatively high initial and ongoing equipment costs. The use of three dimensional analytical models is highly computer resource intensive. The use of purely empirical correlations requires frequent careful calibration of the plant instrumentation and of the correlations themselves.

The second problem relates to insuring that the analytical core model be sufficiently well matched to the operating characteristics of the corresponding reactor core, so that the predictions of core behavior remain stable and realistic over periods of tens of hours in the future, granted a valid initialization of a core predictor. Attempts have been made in the past using conventional core models to track certain operating parameters (power level, control bank position, etc.) in pressurized water reactors as plant operations proceed and to periodically update the analytical core models by, in affect, making projections of core response as the core actually responds. In none of these cases was an attempt made to adjust online any of the set of coefficients in the third component of the core model to force the model to match the actual nuclear characteristics of the core. In all such cases in which the reactor core involved was unstable or nearly unstable to spatial xenon oscillations, deviations between the calculated core average axial power distribution and the actual measured core average axial power distribution, as inferred by comparison of calculated axial offset with measured offset, for example, set in quickly and grew rapidly to a point where the current analytical results were useless and any subsequent predictions of core response would be, at best, suspect. The recently demonstrated use of a full, three dimensional nodal core model, that is at least weakly coupled to the plant instrumentation and that has provision for periodically adjusting the actual neutronics characteristics of the model to force reasonable agreement of the calculated core characteristics for the measurable values of those characteristics, offers the only currently known avenue that could lead to solving this second problem, albeit at a rather high commitment of computer resources. In the face of the foregoing, it is evident that what is needed is a simple on-line, one-dimensional analytical core model, which is far less computer resource intensive than a full three dimensional analytical core model, that can utilize the responses of conventional reactor instrumentation both to periodically update the model data file to account for ongoing plant operations and to, when deemed necessary, adjust the actual neutronics characteristics of the core model to ensure that calculated axial power distributions continue to closely track measured axial power distributions, as indicated by comparing calculated and measured values of axial offset and axial pinch. The close match of the core model to the actual reactor obtained by utilizing monitored reactor instrumentation responses both to continuously update the axial power, iodine, xenon, promethium, samarium and long term burn-up distributions in the core model and to concurrently adjust the nuclear characteristics of the model to match the nuclear characteristics of the core then provides a relatively inexpensive, readily implemented method for solving both of the problems identified above.

U.S. Pat. No. 4,711,753 describes a scheme for utilizing the results obtained from an equilibrium full core flux map to calibrate or adjust certain elements of the analytical model (or data filed) to be used by a core response predictor. In particular, the axial distribution of the transverse buckling values, $B^2_{xy}(Z)$ is adjusted, so that the calculated axial power distribution in the core model closely approximates the core average axial power distribution derived from the flux map. The constraint that the flux map be taken under stable equilibrium core conditions is imposed because no information regarding transient iodine, xenon promethium or samarium distributions can be derived from a single flux map. In this approach the axial distribution of the transverse buckling values takes the form:

$$B^2_{xy}(z) = \sum_{n=1}^{N} A_n F_n(z) \quad (1)$$

which when expanded becomes:

$$B^2_{xy}(Z) = A_1 F_1(Z) + A_4 F_4(Z) + A_5 F_5(Z) + \ldots \quad (2)$$

The calibration or adjustment process consists in determining the values of the set of expansion coefficients, $A_n$, that results in the best matching of a series of integral parameters characterizing the calculated axial power distributions to the corresponding parameters characterizing the core average axial power distribution derived from the flux map. The particular parameters include the well known axial offset parameter (AO) and other progressively higher order terms involving integrals over thirds, quarters and fifths of the core height. Due to the complex relationship of calculated axial power distribution to the core model, of which transverse buckling is only one of several components, the values of the expansion coefficients must be found by a guided trial and error search process involving several nested levels of search, details of which are given in the referenced patent. The whole procedure is feasible only because the particular set of expansion functions used, the $F_n(Z)$ functions, has the unique property of effectively decoupling the searches for the successive expansion coefficient values. Thus, the $A_1$ coefficient influences the reactivity balance, but does not significantly affect any aspect of power distribution. The $A_2$ coefficient controls the axial offset aspect of the power distribution but does not materially affect axial pinch (AP), etc. aspects, and so on. That the decoupling is effective has been demonstrated theoretically, and by repeated application of the calibration procedure to a variety of analytical core models. However, the calibration procedure described in U.S. Pat. No. 4,711,753 is applicable only when the results of a recent flux map taken under equilibrium core conditions are available. This occurs typically once a month in a conventional operating pressurized water reactor. Therefore, the needed system must be able to readjust the values of at least the dominant transverse buckling coefficients, specifically the $A_2$ and $A_3$ coefficients of equation (2) on-line and on a nominally continuous basis until the next monthly calibration becomes available to compensate for minor defects in the analytical core model and/or the neutronics algorithms being used.

SUMMARY OF THE INVENTION

It is an object of the present invention to provide a method for continuously updating the current distribution and related parameters of a nuclear reactor core analytical model.

It is an additional object of the present invention to provide a method for continuously, on line adjusting aspects of an analytical core model to closely reflect the actual characteristics of the monitored reactor core, thereby insuring that the other initialization parameters of the model are correctly and validly updated as reactor operations proceed.

It is a further object of the present invention to provide an updating and adjusting capability without requiring the availability of a complex core power distribution synthesis facility.

It is still another object of the present invention to provide a system that functions in the background, updating and adjusting the model without intervention by the user, so that the model will be accurate when needed.

The above objects can be attained by a system that updates and adjusts an analytical core model periodically using measured values available for normal core instrumentation. An initial reference calibration of the core model is made using results from an equilibrium flux map and a concurrently measured reactor coolant system boron concentration value. Thereafter, the analytical model is updated and adjusted on-line to replicate actual core operations as they progress. To accomplish this, changes are made in the model to track measured changes in the core power level, control bank position, core inlet temperature and so forth, and the model is depleted over progressive, short time steps to update the calculated values of axial power distribution and axial iodine, xenon, promethium, samarium and long term burn-up distribution at each update. Concurrently, values of the axial offset and axial pinch parameters are extracted from the calculated axial power distribution and are compared with estimates of the actual core average axial offset and axial pinch parameters, derived directly from conventional core instrumentation responses without intermediate core average axial power distribution synthesis, to determine whether an adjustment of certain of the analytical core model coefficients is needed. If either the calculated axial offset or calculated axial pinch parameter differs from the measured value of the axial offset or axial pinch by more than a preset tolerance, the adjustment process, operating on the second and third coefficients of the analytical transverse buckling expansion is set in motion.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
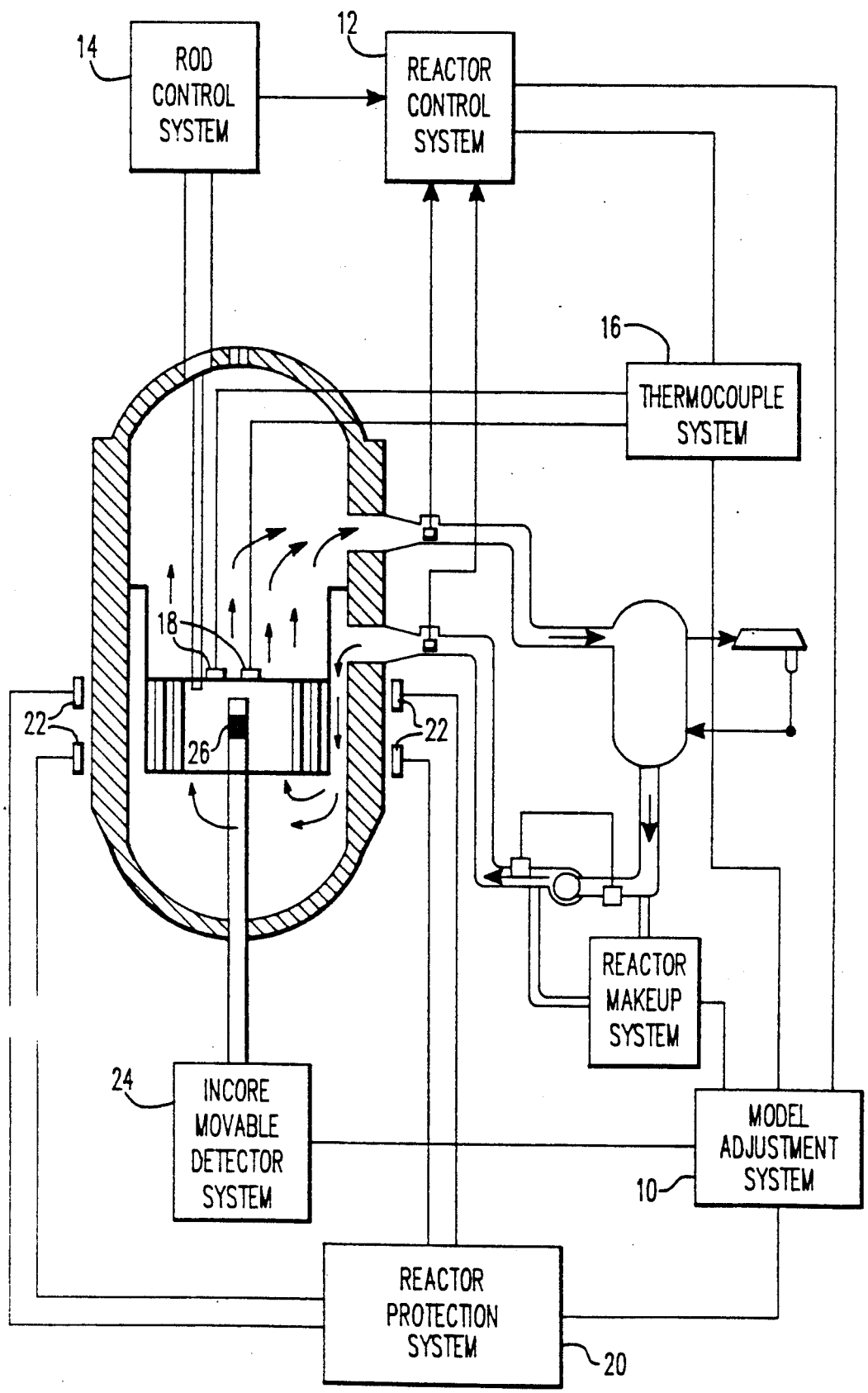
FIG. 1 illustrates a reactor with a model adjustment system 10 in accordance with the present invention.

The present invention, when used online on a nominally continuous basis, will provide both frequent periodic updates of certain of the contents of a one dimensional (axial) analytical model and as—required adjustments of certain other contents of the model, so that the analytical core model can serve the dual functions of supplying to a graphic system the necessary data that permits the generation of graphic displays regarding current core conditions and trends of immediate use to the reactor operator and of providing a reliable basis for intializing sequences of analytical predictions of expected core response to anticipated plant maneuvers when requested by plant personnel or by dedicated automatic control systems.

In addition, the present invention will defeat the tendency mentioned earlier of the analytically updated axial power distributions generated by a core response predictor to progressively deviate from the true core average axial power distribution. Constraining the analytically calculated axial power distribution to closely approximate the true core average axial power distribution insures that the calculated axial distributions of iodine, xenon, (promethium and samarium, if explicitly represented) and long term burn-up will also closely approximate the corresponding existing core average distributions.

Specifically, the present invention, on a continuous, automatic and periodic basis, determines a "measured" value of incore axial offset synthesized from conventional plant instrumentation response signals as a basis for adjusting the $A_2$ coefficient in the analytical representation of the axial distribution of transverse buckling values in the analytical core model to force a match between the axial offset of the calculated axial power distribution and the measured incore axial offset value. The present invention also synthesizes a measured value of incore axial pinch from plant instrumentation response signals and the measured axial pinch value is used in like manner to adjust the $A_3$ coefficient in the representation of the axial distribution of transverse buckling values in the analytical core model to force a match between the axial pinch of the calculated axial power distribution and the measured incore axial pinch value.

The present invention, in addition to measuring the core power level, control bank position and cold leg temperature signals that are currently supplied to existing core predictors, measures also at a minimum, the signals from the top and bottom detectors of at least one conventional excore power range neutron detector channel. The signal from at least one specified core exit thermocouple is also added to this input signal set. The selection of the thermocouple is described in U.S. Pat. No. 4,774,050 and a second thermocouple can also be selected and used for verification. If one or more so-called "multi-section" incore neutron detectors are in service at a particular installation or one or more strings of fixed incore detectors with at least three detectors per string is/are in service, the signals from the individual excore detector sections or fixed incore detectors are appropriate substitutes for the combination of two section incore detector signals and the core exit thermocouple signal. The two detector signals, together with the control bank position signal, along with the other variables supplied to the model, are used to synthesize the measured axial offset value (AO) directly using the equation below:

$$AO_{meas.} = B_1 \times \frac{DR_t}{Q} + B_2 \times \frac{DR_b}{Q} + B_3 \times bp \quad (3)$$

where $B_1$-$B_3$ are axial offset expansion coefficients that are obtainable by a person of ordinary skill in the art by using a least squares fit calibration against a set of transient flux maps, $DR_t$ and $DR_b$ are the signals from the top and bottom sections of the incore detector, Q is core thermal power level conventionally provided to prediction models and bp is controlling bank position. In the least squares fit calibration mentioned above a series of flux maps, taken over a period of a few days once each quarter where the core is put into a transient axial oscillation state and the flux maps, are taken at various values of axial offset and least squares fit to obtain the coefficients. The axial pinch is synthesized by adding a term representative of local coolant enthalpy rise in the peripheral region of the core seen by the incore detectors and using a correlation of the form:

$$AP_{meas.} = C_1 \times \frac{DR_t}{Q} + C_2 \times \frac{DR_b}{Q} + C_3 \times h_D + C_4 \times \frac{\Delta h}{Q} \quad (4)$$

where $C_1$-$C_4$ are axial pinch expansion coefficients obtainable by a least squares fit calibration against a series of transient flux maps as mentioned above and $\Delta h$ is the local enthalpy rise derived from the core exit thermocouple signal and from a cold leg temperature signal as set forth in U. S. Pat. No. 4,774,050.

If one or more "multi-section" incore detectors or one or more strings of fixed incore detectors are available, the measured axial offset value and the corresponding measured axial pinch value can be synthesized using:

$$AO_{meas.} = F_{AO}(I_{top}, I_{upper\ middle}, I_{lower\ middle}, I_{bottom}, h_D) \quad (5)$$

$$AP_{meas.} = F_{AP}(I_{top}, I_{upper\ middle}, I_{lower\ middle}, I_{bottom}, h_D) \quad (6)$$

where the I's represent the currents generated by, for example, the individual sections of "multi-section" incore detector and the functions are simple numerical correlations between detector values and the actual offset or pinch determined at these values determinable by a nuclear engineer familiar with the detector system and the reactor core structure.

The present invention on a prespecified periodic basis (every five minutes, for example) determines the values of time, power level, control bank position, cold leg temperature, RCS pressure (optionally), axial offset and axial pinch. The time, power level, control bank position, cold leg temperature and pressure (if provided) are used to update the model data file that contains the description of the current core model parameters. From the model, calculated core axial power distribution values of axial offset and axial pinch are extracted. The calculated values of axial offset and axial pinch are compared to the "measured" values of axial offset and axial pinch. If the respective values are in agreement within a prespecified tolerance, that is, if the current deviations or the time integral deviations, for a more accurate tracking function, are below a predetermined threshold, the updated model core description is stored and the updating process is suspended until the next scheduled update time. If the value of either calculated axial offset or calculated axial pinch fails to match the corresponding measured value within the specified tolerable error, adjustment, in a manner as described in U.S. Pat. No. 4,711,753, of the values of the $A_2$ and $A_3$ expansion coefficients in the analytical representation of the axial distribution of transverse buckling values are made to obtain acceptable agreement between the calculated and measured values of axial offset and axial pinch. When satisfactory agreement is obtained, the resulting analytical core description is stored and the updating process is suspended until the next scheduled update time.

As illustrated in FIG. 1 the model adjustment system 10 obtains the core thermal power from a reactor control system 12 and control bank position information from a rod control system 14. The thermocouple system 16 connected to thermocouples 18, positioned at core fuel assembly exits, along with cold leg temperature obtained from the reactor control system 12 allow determination of the enthalpy rise while neutron detector signals are provided by a reactor protection system 20 connected to incore detectors 22 or from an incore fixed detector system 24 connected to incore detector strings 26. The systems 10, 12, 14, 16, 20 and 24 are normally provided as software modules in the plant computer.

Figure 2:
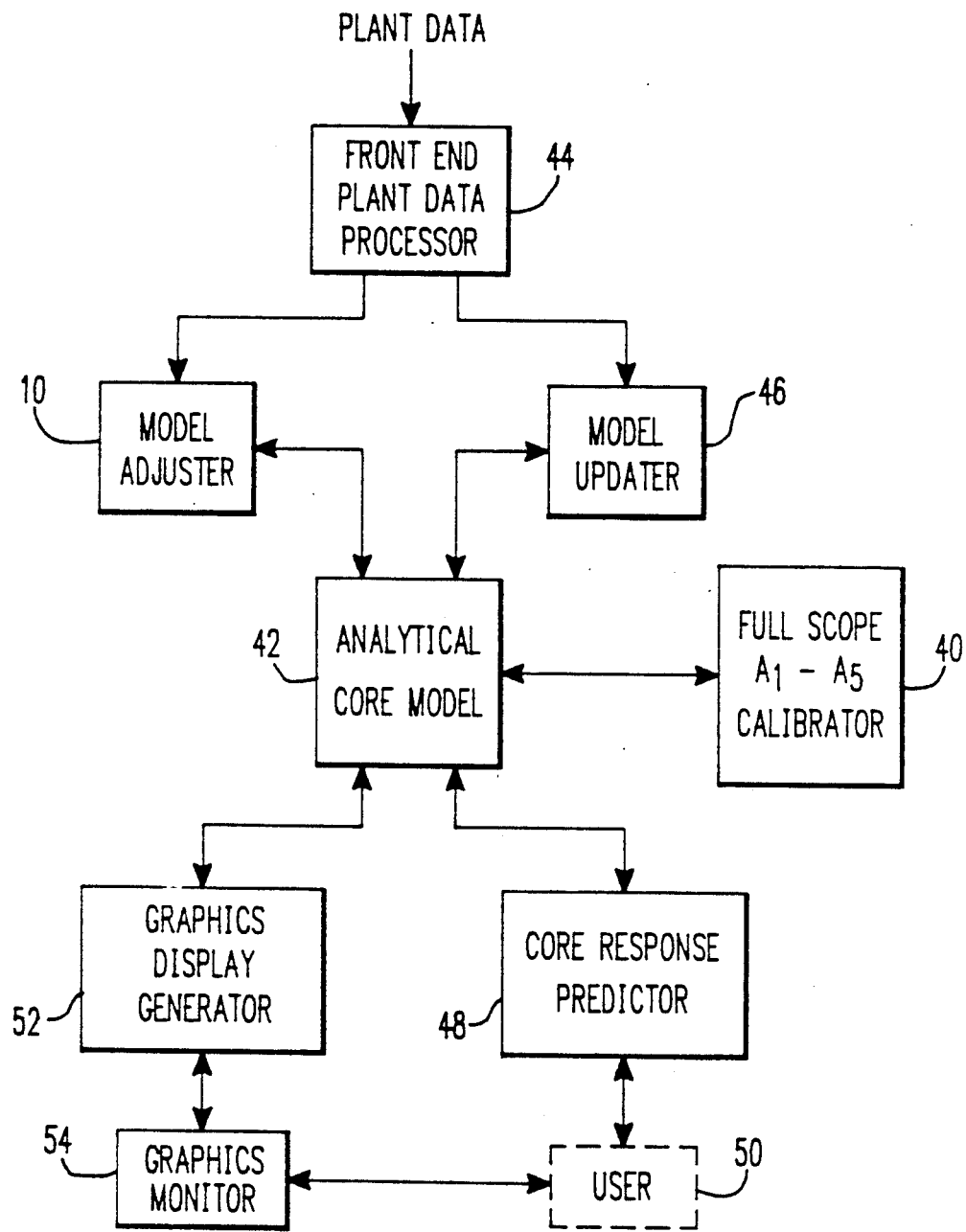
FIG. 2 illustrates the relationship of the model adjustment system 10 of the present invention to other systems associated with core condition determination and prediction.

The relationship of the model adjustment system 10 to other software modules is illustrated in FIG. 2. Monthly a full scope calibrator 40 obtains the equilibrium power, axial iodine, xenon, promethium, samarium and long-term burn up distributions from the model file 42 along with an input boron concentration and iteratively, performs a conventional 1-D diffusion theory calculation of axial power shape with an equilibrium xenon distribution, compares the AO, AP, AQ, AR components of the calculated power distribution with the corresponding components of the average axial power distribution derived from a conventional equilibrium flux map and adjusts the $A_1$-$A_5$ expansion coefficients of equation (2) until the calculated critical power shape of the model 42 closely matches the measured power shape in a manner as described in U.S. Pat. No. 4,711,753.

Thereafter, a conventional front end data processor 44 obtains the plant instrumentation data previously discussed and supplies such to the adjuster module 10. This module or tracker model adjuster system 10 of the present invention substantially continuously, automatically and online adjusts the analytical core model 42 concurrently with an update of the model 42 by a model update system 46. With the substantially continuously adjusted analytical core model a conventional core response predictor 48 can predict the response of the nuclear reactor to contemplated changes entered by the user 50 by using the axial iodine, xenon, promethium, samarium, long term burn-up and transverse buckling distributions stored in the file as a starting point for a prediction in response to a user specified maneuver. In addition, the model can be used by a conventional graphics display generator 52 such as described in U.S. Pat. No. 4,642,213 to produce a display for the user 50 on a graphics monitor 54.

Figure 3:
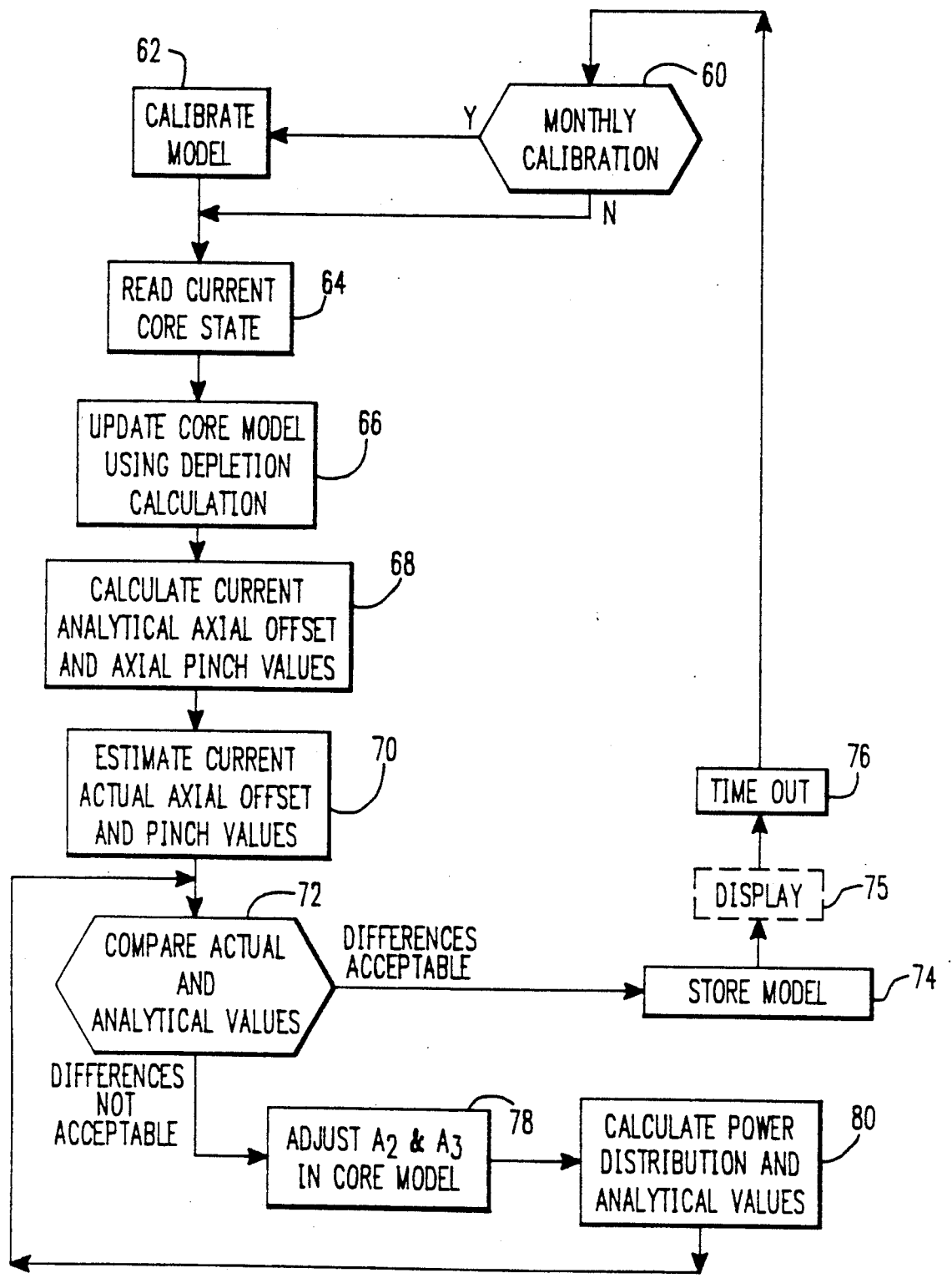
FIG. 3 illustrates the operation of the system 10 of the present invention.

An example of a possible sequence of execution of the steps necessary in the present invention to automatically, without user intervention, continuously update the analytical core model initiation parameters is illustrated in FIG. 3. At the beginning of a monthly update cycle 60 a flux map is conventionally obtained, boron concentration in the reactor cooling system is determined and the calibration as described in U.S. Pat. No. 4,711,753 is executed to calibrate 62 the model or data file to particularly adjust the $A_1$-$A_5$ coefficients. It is also possible to obtain the $A_1$-$A_5$ coefficients periodically from reactor design calculations as a much less desirable alternative. If the model has been calibrated or after a determination that the monthly calibration is not necessary is made the current state of the core is progressively read 64 as core operations proceed. This involves obtaining the current time, power level, rod positions, inlet temperature, pressure, detector readings and core exit thermocouple readings from the core instrumentation sensors. At this step the core model 42 is then read in from its storage location and the core model is updated 66 using a conventional depletion calculation using the time, power level, rod positions inlet temperature and pressure.

Next the current analytical axial offset and axial pinch values are calculated using conventional neutronics equations such as the one dimensional diffusion theory algorithms, the one dimensional nodal algorithms or the one dimensional neutron transport algorithms, such as is found in the full scope calibrator 40 or core response predictor 48, by performing a conventional criticality search. Next the current actual axial offset and pinch values 70 are estimated using equations 3 and 4 using the detector readings, thermocouple reading, rod positions, inlet temperature and power level where enthalpy rise $\Delta h$ is calculated as set forth in U.S. Pat. No. 4,774,050. The actual values determined using equations 3 and 4 are compared 72 to the analytical values. If the absolute value of the difference between the calculated analytical axial offset and measured actual axial offset is less than or equal to a predetermined value n, for example 0.5%, and the absolute value of the difference between calculated analytical axial pinch and measured actual axial pinch is less than or equal to a predetermined value m which could be the same 0.5%, the differences are acceptable and the model need not be adjusted. As a more accurate alternative the absolute values discussed above should be integrated over time prior to performing the comparison with the predetermined constants n and m, respectively, and this will provide a more accurate determination of the total drift or cumulative drift in the core from the previously established model initialization values. That is, the increase or decrease in the integrals of the axial offset and axial pinch deviations that have accumulated since the last readjustment of the $A_2$ and $A_3$ parameters should be tested against the preset limits.

If the comparison indicates that the limits have not been exceeded, the system stores 74 the model or data file and waits 76 for a predetermined period of time, that is, waits until it is time for another periodic update cycle. As indicated by the dashed box 75, the system could also display the adjusted and updated model by providing the model to the display generator 52. If deviation is significant, that is, not acceptable, the values of the $A_2$ and $A_3$ coefficients in the buckling equations are adjusted 78. With these adjusted coefficient values the neutronic equations are again used to determine 80 new calculated analytical values for axial offset and axial pinch. The cycle of comparing 72, adjusting 78 and calculating 80 are cyclically executed until the $A_2$ and $A_3$ coefficients are compensated for the drift using a standard method, called over-compensation in control theory, to produce non-zero opposite sign deviation values. This type of compensation requires that the magnitude of the deviation be offset by a deviation in the opposite direction of somewhat less than the magnitude of the deviation. For example, if the deviation is calculated as 0.5% in the positive direction, the compensation criteria require that the compensated result deviate in the negative direction for a value of for example 0.25%. The reason for overcompensating is that the errors that accumulate in the iodine and xenon axial distributions are, in affect, time integrals of axial power distribution errors; and, hence, by over compensating the system is, in effect, burning out the iodine and xenon errors. The time constants of promethium and samarium are relatively large compared to those of iodine and xenon and so their errors are relatively insensitive to the variation in power distribution errors. When compensated the model is stored 74, a time out 76 occurs waiting for a new cycle to begin or a display 75 followed by the time out 76.

In addition to insuring that predictions of core response to anticipated plant operating maneuvers start from realistic current initial conditions, several other benefits from the availability and use of the present invention are provided. Since the present invention is in operation continuously and on-line in a particular installation, it is possible to generate an on-going log of the values of the monitored operating parameters supplied to the system and of changes in the values of the $A_2$ and the $A_3$ expansion coefficients. Such a recording step could be provided after step 74. This log could then be analyzed off-line either manually or automatically to detect correlations between changes in operating conditions and adjustments in the $A_2$ and $A_3$ parameter values. Any correlations identified would point directly to deficiencies in the conventional computational neutronics algorithms. Such deficiencies could then be corrected by an analyst with the result that the analytical algorithms would become progressively more closely attuned to reality.

A calculated value of the critical reactor coolant system boron concentration is available as a by-product of the criticality search because boron concentration is recalculated as the update and adjustment proceeds and this allows the $A_1$ coefficient to also be adjusted when reliable values of reactor core coolant system boron concentration are obtained. Since the core model is routinely adjusted to match the calculated boron concentration value to the measured value secured during monthly flux mapping operations and since the model can be refined to match the calculated boron concentration value to a measured value whenever suitable measured values are obtained, a reliable, frequently updated estimate of current boron concentration can be displayed for the operator's use. Further, systematic deviations of calculated boron concentration from measured values can point to analytical core model deficiencies.

Since the analytical core model will have been checked against the plant just prior to any trip that may occur and since the present invention can update the model (although it can not verify it) when the core is in a subcritical condition, the present invention can be modified to do estimated critical condition and shutdown margin estimates with minimum interaction, except for output of results, with the user.

The many features and advantages of this invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of updating a core model parameter for a system, comprising the steps of:
   (a) calculating a calculated value which correlates to a parameter of the model;
   (b) computing a measured value, which correlates to the parameter, from measured system values;
   (c) determining a deviation between the calculated value and the measured value;
   (d) compensating the parameter when the deviation exceeds a predetermined value; and
   (e) updating the parameter of the model when the parameter is compensated.

2. A method as recited in claim 1, wherein the calculated and measured values comprise calculated and measured axial offset values of a nuclear reactor.

3. A method as recited in claim 1, wherein the calculated and measured values comprises calculated and measured values of axial offset and axial pinch of a nuclear reactor.

4. A method as recited in claim 1, wherein the determined deviation is integrated over time and a time integral deviation is compared to the predetermined value to determine when to compensate.

5. A method of updating analytical model parameters of an analytical model used for prediction of distributions in a nuclear reactor core, comprising the steps of:
   (a) calibrating the model periodically;
   (b) measuring enthalpy rise and obtaining neutron detector signal readings, power level and rod position;
   (c) updating the model using a depletion calculation;
   (d) calculating analytical values of axial offset and axial pinch;
   (e) calculating measured actual axial offset and axial pinch values from the enthalpy rise, readings, power level, position and axial offset and pinch expansion coefficients;
   (f) integrating differences between the measured and analytical values;
   (g) comparing an absolute value of the differences with predetermined compensation indication limits;
   (h) adjusting second and third buckling coefficients until the calculated values are compensated, if one of the absolute values is greater than the corresponding limit;
   (i) updating the parameters when the calculated values are compensated; and (j) displaying the model including the updated parameters.

6. A method as recited in claim 5, wherein step (e) determines axial offset as $$\text{axial offset} = B_1(DR_t/Q) + B_2(DR_b/Q) + B_3 bp$$

where $B_1$, $B_2$ and $B_3$ are offset expansion coefficients, $DR_t$ and $DR_b$ are neutron detector readings, bp is rod bank position, Q is thermal core power level, and determines axial pinch as $$\text{axial pinch} = C_1(DR_t/Q) + C_2(DR_b/Q) + C_3 h_D + C_4(\Delta h/Q)$$

where $C_1$–$C_4$ are pinch expansion coefficients and $\Delta h$ is enthalpy rise in the core.

7. A method as recited in claim 6, further comprising updating boron concentration.

* * * * *